United States Patent
Jing et al.

(10) Patent No.: US 10,503,023 B2
(45) Date of Patent: Dec. 10, 2019

(54) PHOTO ALIGNMENT DEVICE, PHOTO ALIGNMENT METHOD AND ALIGNMENT FILM PREPARATION SYSTEM

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yangkun Jing, Beijing (CN); Lei Hu, Beijing (CN); Ting Guo, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 706 days.

(21) Appl. No.: 15/096,376

(22) Filed: Apr. 12, 2016

(65) Prior Publication Data

US 2016/0332192 A1 Nov. 17, 2016

(30) Foreign Application Priority Data

May 13, 2015 (CN) .......................... 2015 1 0242266

(51) Int. Cl.
*G02F 1/1337* (2006.01)
*G02F 1/13* (2006.01)

(52) U.S. Cl.
CPC ...... *G02F 1/133788* (2013.01); *G02F 1/1303* (2013.01)

(58) Field of Classification Search
None
See application file for complete search history.

(56) References Cited

U.S. PATENT DOCUMENTS

2013/0101755 A1* 4/2013 Lee .................... G02F 1/133707
428/1.23
2013/0165009 A1 6/2013 Yin
(Continued)

FOREIGN PATENT DOCUMENTS

CN 102436098 A 5/2012
CN 102722054 A 10/2012
(Continued)

OTHER PUBLICATIONS

Machine Translation of CN 104166274 A (Year: 2014).*
(Continued)

*Primary Examiner* — Shamim Ahmed
*Assistant Examiner* — Bradford M Gates
(74) *Attorney, Agent, or Firm* — Nath, Goldberg & Meyer; Joshua B. Goldberg; Daniel Bissing

(57) ABSTRACT

The present invention provides a photo alignment device, a photo alignment method and an alignment film preparation system. The photo alignment device comprises a photo alignment unit, a temperature acquisition unit and a control unit, the photo alignment unit used to perform preheating, curing and photo alignment on a film-to-be-aligned layer; the temperature acquisition unit used to perform real-time acquisition on temperatures of the film-to-be-aligned layer during the preheating, curing, and photo alignment in synchronization with the photo alignment unit, and feed the acquired temperatures back to the control unit; and the control unit used to determine whether the fed back temperatures are within preset ranges of temperature, and adjust position, power and/or speed of the photo alignment unit based on the determination result, to cause the temperatures of the film-to-be-aligned layer during the preheating, curing, and photo alignment to be within their respective preset ranges of temperature.

17 Claims, 1 Drawing Sheet

(56) References Cited

U.S. PATENT DOCUMENTS

2013/0342796 A1    12/2013  Chiu
2014/0158675 A1     6/2014  Jing

FOREIGN PATENT DOCUMENTS

| CN | 102784747 A | 11/2012 | |
|---|---|---|---|
| CN | 103558714 A | 2/2014 | |
| CN | 104166274 A | 11/2014 | |
| WO | WO-2014012335 A1 * | 1/2014 | ............. F26B 23/06 |

OTHER PUBLICATIONS

Machine Translation of CN 103558714 A (Year: 2014).*
Office Action dated Sep. 4, 2017 issued in corresponding Chinese Application No. 201510242266.1.
Office Action dated Apr. 1, 2017 issued in corresponding Chinese Application No. 201510242266.1.

* cited by examiner

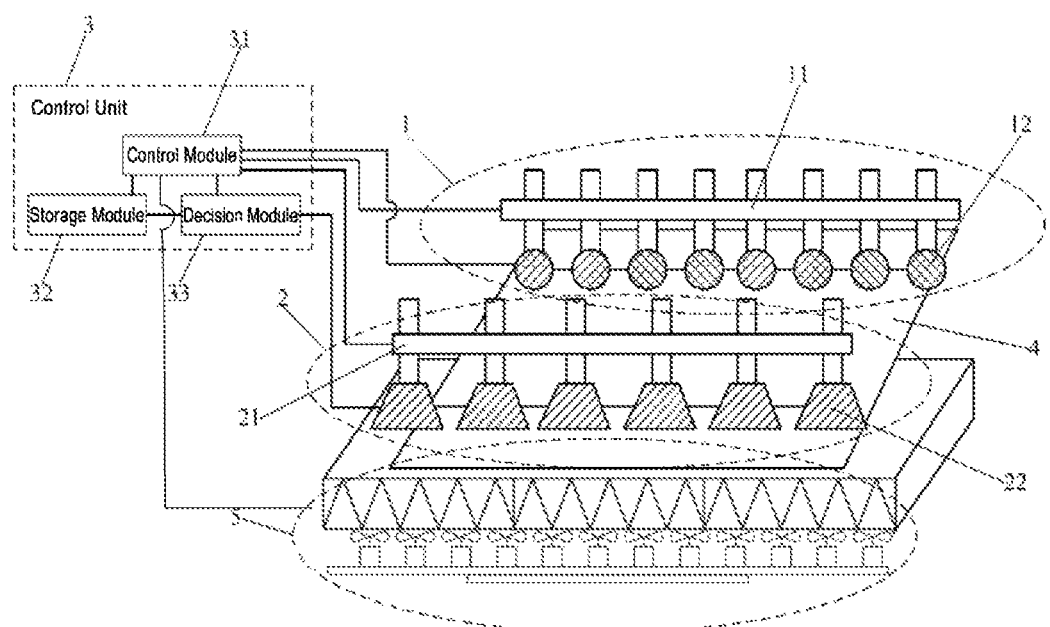

PHOTO ALIGNMENT DEVICE, PHOTO ALIGNMENT METHOD AND ALIGNMENT FILM PREPARATION SYSTEM

FIELD OF THE INVENTION

The present invention relates to the field of display technology, and in particular, relates to a photo alignment device, a photo alignment method and an alignment film preparation system.

BACKGROUND OF THE INVENTION

With the development of display technology and progress of the society, liquid crystal display technology is being more and more widely applied by people, playing very important roles in industrial production and people's lives.

An alignment film that keeps liquid crystal molecules in a particular orientation in the case where there is no effective electric field is generally prepared by two methods: rubbing alignment method and photo alignment method. The rubbing alignment method had been widely used by display panel manufacturers. Rubbing alignment method uses a lint roller to rub a surface of a film-to-be-aligned, such that the molecules on the surface of the film-to-be-aligned are arranged in a particular direction. However, when the roller rubs the film-to-be-aligned, dust particles and electrostatic residues may be easily generated, affecting the yield of the product. Therefore currently photo alignment method is commonly employed to align the film-to-be-aligned.

Photo alignment method utilizes polarized light, produced by ultra-violet (UV) light passing through a polarizer, to illuminate a film-to-be-aligned on a substrate, thereby aligning the film-to-be-aligned, and causing the surface of the film-to-be-aligned to have optical anisotropy. Photo alignment method can improve yield of the product and stability of production equipment.

But during the alignment by UV polarized light, photo alignment method would result in incomplete curing of film-to-be-aligned if the temperature is too low. If the temperature is too high, then it will cause damage to the film-to-be-aligned, and alignment disorder of the liquid crystal may occur, resulting in alignment defects such as bright spots appearing on the liquid crystal panel at the time of display. Thus temperature control during photo alignment has become critical to photo alignment technology, while a conventional photo alignment apparatus is not able to implement supervision on the temperature during photo alignment.

SUMMARY OF THE INVENTION

The present invention provides a photo alignment device, a photo alignment method and an alignment film preparation system for solving the above technical problem existing in the related art. The photo alignment device can perform real-time monitoring, control and adjustment on temperatures of a film-to-be-aligned layer during the preheating, curing and photo alignment, thereby preventing alignment defects caused by excessively high or excessively low temperatures, further ensuring the alignment quality of the alignment film, and also making the alignment of the alignment film more uniform at the same time.

The present invention provides a photo alignment device, for performing photo alignment on at least one film-to-be-aligned layer formed on a substrate by spraying, comprising: a photo alignment unit, a temperature acquisition unit and a control unit, the photo alignment unit used to perform preheating, curing and photo alignment on the film-to-be-aligned layer formed on the substrate by spraying; the temperature acquisition unit used to perform real-time acquisition on temperatures of the film-to-be-aligned layer during preheating, curing, and photo alignment in synchronization with the photo alignment unit, and to feed the acquired temperatures back to the control unit; and the control unit used to determine whether the fed back temperatures are within preset ranges of temperature, and to adjust position, power and/or speed of the photo alignment unit based on the determination result, to cause the temperatures of the film-to-be-aligned layer during the preheating, curing, and photo alignment to be within their respective preset ranges of temperature.

Preferably, the photo alignment unit comprises a first rack and a light source provided on the first rack, the control unit comprises a control module, the first rack and the light source each are connected to the control module.

The first rack can move back and forth in a direction perpendicular to a board face of the substrate, and can move from one end of the substrate to another end opposite thereto in parallel to the board face of the substrate, under the control of the control module.

The light source can emit light of different illuminances under the control of the control module, to perform preheating, curing and photo alignment on the film-to-be-aligned layer formed on the substrate by spraying.

Preferably, the light source comprises a plurality of ultra-violet light sources, the plurality of ultra-violet light sources are arranged along a straight line, and the plurality of ultra-violet light sources are arranged with equal intervals.

Preferably, the light source comprises a plurality of infra-red light sources and a plurality of ultra-violet light sources, the plurality of infra-red light sources used to perform preheating and curing on the film-to-be-aligned layer; the plurality of ultra-violet light sources used to perform photo alignment on the film-to-be-aligned layer.

The plurality of infra-red light sources are arranged along a straight line, and the plurality of infra-red light sources are arranged with equal intervals; the plurality of ultra-violet light sources are arranged along a straight line, and the plurality of ultra-violet light sources are arranged with equal intervals.

The straight line along which the plurality of infra-red light sources are arranged and the straight line along which the plurality of ultra-violet light sources are arranged are parallel to each other.

Preferably, the temperature acquisition unit comprises a second rack and an infra-red thermodetector provided on the second rack, the second rack connected to the control module, the infra-red thermodetector connected to the control unit.

The second rack can move from one end of the substrate to another end opposite thereto in parallel to the board face of the substrate under the control of the control module.

The infra-red thermodetector is driven by the second rack to acquire in real time a temperature of a region on the film-to-be-aligned layer illuminated by the light source, and send the temperature to the control unit.

Preferably, the control unit further comprises a storage module and a decision module, the storage module used to pre-store the respective preset ranges of temperature of the film-to-be-aligned layer during preheating, curing and photo alignment.

The decision module is used to receive the temperature sent by the infra-red thermodetector, and determine whether the temperature is within the preset range of temperature.

The control module is used, when the determination result of the decision module is negative, to adjust a height of the light source from the surface of the film-to-be-aligned layer, and/or, adjust illuminance of the light source, and/or, adjust a speed at which the light source moves along the surface of the film-to-be-aligned layer, to cause the temperatures of the film-to-be-aligned layer during preheating, curing, and photo alignment to be within their respective preset ranges of temperature.

Preferably, the at least one film-to-be-aligned layer comprises a plurality of film-to-be-aligned layers, each film-to-be-aligned layer formed on the substrate by spraying, the plurality of film-to-be-aligned layers overlapping each other, the surface of the film-to-be-aligned layer located at a relatively low level being flat, and the surface of the film-to-be-aligned layer located at a relatively high level being rugged.

The storage module is further used to store surface status information of the plurality of film-to-be-aligned layers; the control module is further used, based on the surface status information of the plurality of film-to-be-aligned layers, to control the light source to perform preheating, curing and photo alignment on the film-to-be-aligned layer based on the surface status of the film-to-be-aligned layer.

Preferably, the photo alignment device further comprises a cooling unit, the cooling unit provided on a side of the substrate on which the film-to-be-aligned layer is not formed, the cooling unit connected to the control module, and used to perform cooling on the cured film-to-be-aligned layer before the photo alignment, under the control of the control module.

The present invention further provides a photo alignment method, for performing photo alignment on at least one film-to-be-aligned layer formed on a substrate by spraying, comprising: successively performing, by a photo alignment unit, preheating, curing and photo alignment on the film-to-be-aligned layer formed on the substrate by spaying; performing, by a temperature acquisition unit, real-time acquisition on temperatures of the film-to-be-aligned layer during preheating, curing, and photo alignment in synchronization with the photo alignment unit, and feeding, by the temperature acquisition unit, the acquired temperatures back to a control unit; and determining, by the control unit, whether the fed back temperatures are within preset ranges of temperature, and adjusting, by the control unit, position, power and/or speed of the photo alignment unit based on the determination result, to cause the temperatures of the film-to-be-aligned layer during preheating, curing, and photo alignment to be within their respective preset ranges of temperature.

Preferably, the method further comprises performing photo alignment on a plurality of film-to-be-aligned layers formed on the substrate by spraying, the plurality of film-to-be-aligned layers overlapping each other, the surface of the film-to-be-aligned layer located at a relatively low level being flat, and the surface of the film-to-be-aligned layer located at a relatively high level being rugged.

The control unit, based on the surface status information of the plurality of film-to-be-aligned layers, controls the light source to perform preheating, curing and photo alignment on the film-to-be-aligned layer based on the surface status of the film-to-be-aligned layer.

Preferably, the method further comprises: performing, by a cooling unit, cooling on the cured film-to-be-aligned layer before the photo alignment.

The present invention further provides an alignment film preparation system, comprising the photo alignment device described above.

The beneficial effects of the present invention are that the photo alignment device provided by the present invention, provided with the temperature acquisition unit and the control unit, can perform real time monitoring, control and adjustment on temperatures of the film-to-be-aligned layer during the preheating, curing and photo alignment, thereby preventing alignment defects caused by excessively high or excessively low temperatures during the alignment of the alignment film, further ensuring the alignment quality of the alignment film, and also making the alignment of the alignment film more uniform at the same time.

The alignment film preparation system provided by the present invention, by employing photo alignment device described above, not only improves preparation quality of an alignment film, but also improves preparation efficiency of an alignment film.

BRIEF DESCRIPTION OF THE DRAWINGS

FIG. 1 is a structural schematic diagram of a photo alignment device in Embodiment 1 of the present invention.

ILLUSTRATION OF REFERENCE NUMBERS IN THE DRAWING 1. photo alignment unit; 11. first rack; 12. light source; 2. temperature acquisition unit; 21. second rack; 22. infra-red thermodetector; 3. control unit; 31. control module; 32. storage module; 33. decision module; 4. substrate; 5. cooling unit.

DETAILED DESCRIPTION OF THE EMBODIMENTS

In order to help those skilled in the art to better understand the technical solutions of the present invention, a photo alignment device, a photo alignment method and an alignment film preparation system provided in the present invention will be described in further detail in conjunction with the drawing and specific implementations.

Embodiment 1

This embodiment provides a photo alignment device, for performing photo alignment on a film-to-be-aligned layer formed on a substrate by spraying, as shown in FIG. 1, including: a photo alignment unit 1, a temperature acquisition unit 2 and a control unit 3, the photo alignment unit 1 used to perform preheating, curing and photo alignment on the film-to-be-aligned layer formed on the substrate 4 by spraying. The temperature acquisition unit 2 is used to perform real-time acquisition on temperatures of the film-to-be-aligned layer during the preheating, curing, and photo alignment in synchronization with the photo alignment unit 1, and to feed the acquired temperatures back to the control unit 3. The control unit 3 is used to determine whether the fed back temperatures are within preset ranges of temperature, and to adjust position, power and/or speed of the photo alignment unit 1 based on the determination result, so as to cause the temperatures of the film-to-be-aligned layer during the preheating, curing, and photo alignment to be within their respective preset ranges of temperature.

The photo alignment device, provided with the temperature acquisition unit 2 and the control unit 3, can perform real-time monitoring, control and adjustment on temperatures of the film-to-be-aligned layer during the preheating, curing and photo alignment, thereby preventing alignment defects caused by excessively high or excessively low temperatures during the alignment of the alignment film, further ensuring the alignment quality of the alignment film, and also making the alignment of the alignment film more uniform at the same time.

In this embodiment, the photo alignment unit 1 includes a first rack 11 and a light source 12 provided on the first rack 11. The control unit 3 includes a control module 31. The first rack 11 and the light source 12 each are connected to the control module 31. The first rack 11, under the control of the control module 31, can move back and forth in a direction perpendicular to a board face of the substrate 4, and can move from one end of the substrate 4 to another end opposite thereto in parallel to the board face of the substrate 4. The light source 12 can emit light of different illuminances under the control of the control module 31, to perform preheating, curing and photo alignment on the film-to-be-aligned layer formed on the substrate 4 by spraying. Because the desired illuminances of light source 12 for the film-to-be-aligned layer during preheating, curing and photo alignment are different, the light source 12 may be controlled by the control module 31 to emit light of different illuminances during different processes; at the same time, when the temperatures of the film-to-be-aligned layer during different processes do not fall within preset ranges of temperature, the light source 12 may be controlled by control module 31 to change illuminances of the emitted light (i.e. adjust the output power of the light source 12), thereby adjusting temperatures of the film-to-be-aligned layer during different processes, so as to make them meet requirements.

In the above embodiment, the first rack 11 can move back and forth in a direction perpendicular to the substrate 4, thereby facilitating the first rack 11 later driving the light source 12 to perform preheating, curing and photo alignment on the film-to-be-aligned layer with a rugged surface formed on substrate 4; at the same time also facilitating adjusting temperatures of the film-to-be-aligned layer during preheating, curing and photo alignment by adjusting the distance between the light source 12 and the surface of the film-to-be-aligned layer during preheating, curing and photo alignment. The first rack 11 can also move from one end of substrate 4 to another end opposite thereto in parallel to substrate 4, which facilitates the first rack 11 later driving the light source 12 to perform preheating, curing and photo alignment on the whole film-to-be-aligned layer formed on substrate 4 in a scanning manner; while also facilitating adjusting temperatures of the film-to-be-aligned layer during preheating, curing and photo alignment by controlling the scanning speed of the light source 12 relative to the film-to-be-aligned layer.

In this embodiment, the light source 12 includes a plurality of ultra-violet light sources, which are arranged along a straight line with equal intervals therebetween. Such an arrangement can make light irradiating on the film-to-be-aligned layer from the light source 12 more uniform, so that surface morphology of the alignment film subjected to the photo alignment process is more uniform and quality of the alignment film is improved. In this embodiment, ultra-violet light sources are employed for illumination in all the preheating, curing and photo alignment processes of the film-to-be-aligned layer.

In this embodiment, the temperature acquisition unit 2 includes a second rack 21 and an infra-red thermodetector 22 provided on the second rack 21, the second rack 21 is connected to control module 31, and the infra-red thermodetector 22 is connected to control unit 3 (specifically, it may be connected to a decision module 33 included in the control unit 3). The second rack 21 can move from one end of substrate 4 to another end opposite thereto in parallel to substrate 4 under the control of the control module 31, which can cause the infra-red thermodetector 22 to be driven by second rack 21 to follow the light source 12 in movement, thereby enabling the infra-red thermodetector 22 to acquire in real time the temperature of the region on the film-to-be-aligned layer illuminated by the light source 12. The infra-red thermodetector 22 is driven by the second rack 21 to acquire in real time the temperature of the region on the film-to-be-aligned layer illuminated by the light source, and sends the temperature to the control unit 3.

In this embodiment, the control unit 3 further includes a storage module 32 and the decision module 33, and the storage module 32 is used to pre-store the corresponding preset ranges of temperature for the preheating, curing and photo alignment processes of the film-to-be-aligned layer. The decision module 33 is used to receive a temperature sent by the infra-red thermodetector 22, and determine whether the temperature is within the preset range of temperature. The control module 31 is used, when the determination result of the decision module 33 is negative, to adjust the height of the light source 12 from the surface of the film-to-be-aligned layer, and, to adjust illuminance of the light source 12, and, to adjust the speed at which the light source 12 is moving along the surface of the film-to-be-aligned layer, so as to cause the temperatures of the film-to-be-aligned layer during the preheating, curing, and photo alignment to be within their respective preset ranges of temperature. The control module 31 simultaneously adjusts the height of light source 12 from the surface of the film-to-be-aligned layer, illuminance of the light source 12 and the speed at which the light source 12 is moving along the surface of the film-to-be-aligned layer, which can more effectively and rapidly cause the temperatures of the film-to-be-aligned layer during the preheating, curing, and photo alignment to be within their respective preset ranges of temperature, thereby making the surface morphology of the alignment film subjected to the photo alignment process more uniform, and improving the quality of the alignment film.

It is to be noted that, when the determination result of the decision module 33 is negative, the control module 31 may also only adjust any one or two of the height of the light source 12 from the surface of the film-to-be-aligned layer, illuminance of the light source 12 and the speed at which the light source 12 is moving along the surface of the film-to-be-aligned layer, as long as the temperatures of the film-to-be-aligned layer during the preheating, curing, and photo alignment are within their respective preset ranges of temperature.

In this embodiment, there are a plurality of film-to-be-aligned layers, each film-to-be-aligned layer formed on the substrate 4 by spraying, the plurality of film-to-be-aligned layers overlapping each other, the surface of the film-to-be-aligned layer located at a relatively low level being flat, and the surface of the film-to-be-aligned layer located at a relatively high level being rugged; the storage module 32 is further used to store surface status information of the plurality of film-to-be-aligned layers; the control module 31 is further used to, based on the surface status information of the plurality of film-to-be-aligned layers, control the light source 12 to perform preheating, curing and photo alignment on the film-to-be-aligned layers based on the surface status of the film-to-be-aligned layers. That is, for a film-to-be-aligned layer with a flat surface, in the process of controlling the first rack 11 by the control module 31 to cause the light source 12 to illuminate the film-to-be-aligned layer in a scanning manner when performing preheating, curing and photo alignment, the distance between the light source 12 and the surface of the film-to-be-aligned layer is maintained constant, thereby causing the film-to-be-aligned layer with a flat surface to be aligned uniformly. For a film-to-be-aligned layer with a rugged surface, during the preheating, curing and photo alignment, the control module 31 controls the first rack 11 to move along a track that resembles the shape of the surface of the film-to-be-aligned layer, to cause the light source 12 to illuminate and scan the film-to-be-aligned layer along the track that resembles the shape of the surface of the film-to-be-aligned layer, thereby causing the film-to-be-aligned layer with a rugged surface to be aligned uniformly.

In this embodiment, the photo alignment device further includes a cooling unit 5. The cooling unit 5 is provided on a side of the substrate 4 where the film-to-be-aligned layer is not formed. The cooling unit 5 is connected to the control module 31, and is used for performing cooling on the cured film-to-be-aligned layer before the photo alignment, under the control of the control module 31. The photo alignment procedure includes three processes of preheating, curing and photo alignment, and the three processes of preheating, curing and photo alignment are performed successively. Typically the temperature of the surface of the film-to-be-aligned layer is relatively low when preheating is performed, while the temperature of the surface of the film-to-be-aligned layer is relatively high when curing is performed, yet when photo alignment is performed the temperature of the surface of the film-to-be-aligned layer needs to be lower than that when curing is performed. With the cooling unit 5, the temperature of the surface of the cured film-to-be-aligned layer can be rapidly decreased, to allow the surface temperature of the film-to-be-aligned layer to meet the preset range of temperature for photo alignment process as soon as possible, thereby allowing the film-to-be-aligned layer to meet respective preset ranges of temperature in each process, while also improving the alignment efficiency and alignment quality.

In the above embodiment, the cooling unit 5 may employ a water-cooling device and an air-cooling device that work together. The water-cooling device is close to the board face of the substrate 4 on the side where the film-to-be-aligned layer is not formed, and the air-cooling device is provided on the side of the water-cooling device that is remote from the substrate 4. Such an arrangement can allow the temperature of the cured film-to-be-aligned layer to decline quickly and uniformly, so as to perform photo alignment process on the film-to-be-aligned layer at a more suitable temperature.

Based on the above structure of the photo alignment device, this embodiment further provides a photo alignment method, comprising: successively performing, by the photo alignment unit 1, preheating, curing and photo alignment on the film-to-be-aligned layer formed on substrate 4 by spaying; performing, by the temperature acquisition unit 2, real-time acquisition on temperatures of the film-to-be-aligned layer during the preheating, curing, and photo alignment in synchronization with photo alignment unit 1, and feeding the acquired temperatures back to the control unit 3; and determining, by the control unit 3, whether the fed back temperatures are within preset ranges of temperature, and adjusting position, power and/or speed of the photo alignment unit 1 based on the determination result, to cause the temperatures of the film-to-be-aligned layer during the preheating, curing, and photo alignment to be within their respective preset ranges of temperature.

The method further includes: performing photo alignment on a plurality of film-to-be-aligned layers formed on the substrate 4 by spraying. The plurality of film-to-be-aligned layers overlap each other. The surface of the film-to-be-aligned layer located at a relatively low level is flat, and the surface of the film-to-be-aligned layer located at a relatively high level is rugged. The control unit 3, based on the surface status information of the plurality of film-to-be-aligned layers, controls the photo alignment unit 1 to perform preheating, curing and photo alignment on the film-to-be-aligned layers based on the surface status of the film-to-be-aligned layers on the substrate 4.

The method further includes: performing, by the cooling unit 5, cooling on the cured film-to-be-aligned layer before the photo alignment.

Detailed steps of the photo alignment method are as follows.

Step 1: forming, by a spraying apparatus, one or more film-to-be-aligned layers on the substrate 4 by spraying.

Step 2: based on the surface status information of one or more film-to-be-aligned layers stored in the storage module 32, controlling, by the control module 31, the first rack 11 to drive the light source 12 to move in parallel to the substrate 4 from one end of substrate 4 to another end opposite thereto at a certain scanning speed in an appropriate scanning manner (for film-to-be-aligned layer with a flat surface, the distance between the light source and the surface of the film-to-be-aligned layer is maintained constant; for film-to-be-aligned layer with a rugged surface, the light source moves along a track that resembles the shape of the surface of the film-to-be-aligned layer); in this scanning process, the light source 12 emits light of a certain illuminance to perform preheating on the one or more film-to-be-aligned layers; synchronously, controlling, by the control module 31, the second rack 21 to drive the infra-red thermodetector 22 to follow the light source 12 at the same scanning speed so that the region where the temperature is being acquired by the infra-red thermodetector 22 and the region of substrate 4 being illuminated by the light source 12 are kept coinciding with each other all the time; transmitting in real time, by the infra-red thermodetector 22, the temperature acquired in real time to the decision module 33 in the control unit 3.

Step 3: determining, by the decision module 33, whether the fed-back temperature is within the preset range of temperature for preheating process, if yes, continuing to perform preheating process on regions of the film-to-be-aligned layer that are not yet preheated; if no, controlling, by the control module 31, the first rack 11 to move along a direction perpendicular to the board face of the substrate 4 to adjust the height of the light source 12 from the surface of the film-to-be-aligned layer; at the same time, controlling, by the control module 3, the illuminance of the light emitted by the light source 12 (which is realized by adjusting output power of the light source 12), and the speed at which the first rack 11 drives light source 12 to move along the board face in parallel to the substrate 4 so that the temperature acquired by the infra-red thermodetector 22 in real time falls within the preset range of temperature for preheating process.

Step 4: continuing to perform preheating process on regions of the film-to-be-aligned layer that are not yet preheated, until the preheating process is finished on the whole film-to-be-aligned layer.

Step 5: perform curing process on the film-to-be-aligned layer following above Steps 2-4.

Step 6: after finishing curing process on the whole film-to-be-aligned layer, turning on the cooling unit 5, to rapidly cool the film-to-be-aligned layer into the preset range of temperature for photo alignment process, then performing photo alignment process on the film-to-be-aligned layer following above Steps 2-4.

It is to be noted that, during the photo alignment process, light emitted by the light source 12 illuminates the surface of the film-to-be-aligned layer after passing through a polarizer, thereby realizing photo alignment of the surface of the film-to-be-aligned layer.

In the above photo alignment procedure, the preheating, curing and photo alignment all employ ultra-violet light source. Compared to a conventional photo alignment device, the photo alignment device in this embodiment does not need to additionally provide heating apparatus, thereby saving energy consumption, and reducing the cost of photo alignment.

Embodiment 2

This embodiment provides a photo alignment device, and the difference from Embodiment 1 is that the light source includes a plurality of infra-red light sources and a plurality of ultra-violet light sources. The plurality of infra-red light sources are used for performing preheating and curing on the film-to-be-aligned layer; the plurality of ultra-violet light sources are used for performing photo alignment on the film-to-be-aligned layer. The plurality of infra-red light sources are arranged along a straight line with equal intervals therebetween; the plurality of ultra-violet light sources are arranged along a straight line with equal intervals therebetween. The straight line along which the plurality of infra-red light sources are arranged and the straight line along which the plurality of ultra-violet light sources are arranged are parallel to each other.

That is, in this embodiment, infra-red light sources are employed to perform preheating and curing on the film-to-be-aligned layer, and ultra-violet light sources are employed to perform photo alignment on the film-to-be-aligned layer.

Other structures and photo alignment method of the photo alignment device in this embodiment are the same as those in Embodiment 1, thus descriptions thereof are not repeated herein.

Beneficial effects of Embodiments 1-2 are that: the photo alignment devices provided in Embodiments 1-2, provided with the temperature acquisition unit and the control unit, are able to perform real-time monitoring, control and adjustment on temperatures of the film-to-be-aligned layer during preheating, curing and photo alignment, thereby preventing alignment defects caused by excessively high or excessively low temperatures during the alignment of the alignment film, further ensuring the alignment quality of the alignment film, and also making the alignment of the alignment film more uniform at the same time.

Embodiment 3

This embodiment provides an alignment film preparation system, comprising the photo alignment device in any one of Embodiments 1-2.

By employing the photo alignment device in any one of Embodiments 1-2, alignment film preparation quality of the alignment film preparation system is improved, and alignment film preparation efficiency of the alignment film preparation system is also improved at the same time.

It is to be understood that above implementations are exemplary implementations that are merely employed to illustrate the principle of the present invention, and the present invention is not limited thereto. For the ordinary skilled in the art, it is possible to make various variations and modifications without departing from the spirit and nature of the present invention, and these variations and modifications are also regarded as within the scope of protection of the present invention.

The invention claimed is:

1. photo alignment device, for performing photo alignment on at least one film-to-be-aligned layer formed on a substrate by spraying, comprising: a photo alignment unit, a temperature acquisition unit and a control unit,
   the photo alignment unit is configured to perform preheating, curing and photo alignment on the film-to-be-aligned layer formed on the substrate by spraying;
   the temperature acquisition unit is configured to perform real-time acquisition on temperatures of the film-to-be-aligned layer during preheating, curing, and photo alignment in synchronization with the photo alignment unit, and to feed the acquired temperatures back to the control unit; and
   the control unit is configured to determine whether the fed back temperatures are within preset ranges of temperature, and to adjust position, power and for speed of the photo alignment unit based on the determination result, to cause the temperatures of the film-to-be-aligned layer during preheating, curing, and photo alignment to be within their respective preset ranges of temperature;
   wherein the photo alignment unit comprises a first rack and a light source provided on the first rack, the control unit comprises a control module, the first rack and the light source each are connected to the control module;
   the first rack can move back and forth in a direction perpendicular to a board face of the substrate, and can move from one end of the substrate to another end opposite thereto in parallel to the board face of the substrate, under the control of the control module; and
   the light source can emit light of different illuminances under the control of the control module, to perform preheating, curing and photo alignment on the film-to-be-aligned layer formed on the substrate by spraying.

2. The photo alignment device of claim 1, wherein the light source comprises a plurality of ultra-violet light sources, and the plurality of ultra-violet light sources are arranged along a straight line with equal intervals therebetween.

3. The photo alignment device of claim 1, wherein the light source comprises a plurality of infra-red light sources and a plurality of ultra-violet light sources, the plurality of infra-red light sources are configured to perform preheating and curing on the film-to-be-aligned layer; the plurality of ultra-violet light sources are configured to perform photo alignment on the film-to-be-aligned layer;
   the plurality of infra-red light sources are arranged along a straight line with equal intervals therebetween; the plurality of ultra-violet light sources are arranged along a straight line with equal intervals therebetween; and
   the straight line along which the plurality of infra-red light sources are arranged and the straight line along which the plurality of ultra-violet light sources are arranged are parallel to each other.

4. The photo alignment device of claim 1, wherein the temperature acquisition unit comprises a second rack and an infra-red thermodetectorprovided on the second rack, the second rack is connected to the control module, the infra-red thermodetector is connected to the control unit;

the second rack can move from one end of the substrate to another end opposite thereto in parallel to the board face of the substrate under the control of the control module;

the infra-red thermodetector is driven by the second rack to acquire in real time a temperature of a region on the film-to-be-aligned layer illuminated by the light source, and sends the temperature to the control unit.

5. The photo alignment device of claim 4, wherein the control unit further comprises a storage module and a decision module, the storage module is configured to pre-store the respective preset ranges of temperature of the film-to-be-aligned layer during preheating, curing and photo alignment;

the decision module is configured to receive the temperature sent by the infra-red thermodetector, and determine whether the temperature is within the preset range of temperature;

the control module is configured to, when the determination result of the decision module is negative, adjust a height of the light source from the surface of the film-to-be-aligned layer, and/or, adjust illuminance of the light source, and/or, adjust a speed at which the light source moves along the surface of the film-to-be-aligned layer, to cause the temperatures of the film-to-be-aligned layer during preheating, curing, and photo alignment to be within their respective preset ranges of temperature.

6. The photo alignment device of claim 5, wherein the at least one film-to-be-aligned layer comprises a plurality of film-to-be-aligned layers, each film-to-be-aligned layer is formed on the substrate by spraying, the plurality of film-to-be-aligned layers overlap each other, the surface of the film-to-be-aligned layer located at a relatively low level is flat, and the surface of the film-to-be-aligned layer located at a relatively high level is rugged;

the storage module is further configured to store surface status information of the plurality of film-to-be-aligned layers; the control module is further configured to, based on the surface status information of the plurality of film-to-be-aligned layers, control the light source to perform preheating, curing and photo alignment on the film-to-be-aligned layer based on the surface status of the film-to-be-aligned layer.

7. The photo alignment device of claim 5, further comprising a cooling unit, which is provided on a side of the substrate on which the film-to-be-aligned layer is not formed, and is connected to the control module, for performing cooling on the cured film-to-be-aligned layer before the photo alignment under the control of the control module.

8. An alignment film preparation system, comprising the photo alignment device of claim 1.

9. An alignment film preparation system, comprising the photo alignment device of claim 2.

10. An alignment film preparation system, comprising the photo alignment device of claim 3.

11. An alignment film preparation system, comprising the photo alignment device of claim 4.

12. An alignment film preparation system, comprising the photo alignment device of claim 5.

13. An alignment film preparation system, comprising the photo alignment device of claim 6.

14. An alignment film preparation system, comprising the photo alignment device of claim 7.

15. A photo alignment method, for performing photo alignment on at least one film-to-be-aligned layer formed on a substrate by spraying, comprising: successively performing, by a photo alignment unit, preheating, curing and photo alignment on the film-to-be-aligned layer formed on the substrate by spaying; performing, by a temperature acquisition unit, real-time acquisition on temperatures of the film-to-be-aligned layer during preheating, curing, and photo alignment in synchronization with the photo alignment unit, and feeding, by the temperature acquisition unit, the acquired temperatures back to a control unit; and determining, by the control unit, whether the fed back temperatures are within preset ranges of temperature, and adjusting, by the control unit, position, power and /or speed of the photo alignment unit based on the determination result, to cause the temperatures of the film-to-be-aligned layer during preheating, curing, and photo alignment to be within their respective preset ranges of temperature;

wherein the photo alignment unit comprises a first rack and a light source provided on the first rack, the control unit comprises a control module, the first rack and the light source each are connected to the control module;

the first rack can move back and forth in a direction perpendicular to a board face of the substrate, and can move from one end of the substrate to another end opposite thereto in parallel to the board face of the substrate, under the control of the control module; and the light source can emit light of different illuminances under the control of the control module, to perform preheating, curing and photo alignment on the film-to-be-aligned layer formed on the substrate by spraying.

16. The photo alignment method of claim 15, further comprising performing photo alignment on a plurality of film-to-be-aligned layers formed on the substrate by spraying, the plurality of film-to-be-aligned layers overlapping each other, the surface of the film-to-be-aligned layer located at a relatively low level being flat, and the surface of the film-to-be-aligned layer located at a relatively high level being rugged;

the control unit, based on the surface status information of the plurality of film-to-be-aligned layers, controls the light source to perform preheating, curing and photo alignment on the film-to-be-aligned layer based on the surface status of the film-to-be-aligned layer.

17. The photo alignment method of claim 15, further comprising: performing, by a cooling unit, cooling on the cured film-to-be-aligned layer before the photo alignment.

* * * * *